United States Patent
Lee et al.

(10) Patent No.: US 11,512,159 B2
(45) Date of Patent: Nov. 29, 2022

(54) CURABLE COMPOSITION, METHOD OF PREPARING CURABLE COMPOSITION, CURED MATERIAL OF CURABLE COMPOSITION, METHOD OF PREPARING CURED MATERIAL, AND ELECTRONIC DEVICE INCLUDING CURED MATERIAL

(71) Applicants: Samsung Display Co., Ltd., Yongin-si (KR); Myongji University Industry And Academia Cooperation Foundation, Yongin-si (KR)

(72) Inventors: Sanggu Lee, Yongin-si (KR); Junhyup Lee, Yongin-si (KR); Yoongook Park, Yongin-si (KR); Intae Son, Yongin-si (KR); Onnuri Kim, Yongin-si (KR); Hoyun Byun, Yongin-si (KR); Younghye Son, Yongin-si (KR)

(73) Assignees: Samsung Display Co., Ltd., Yongin-si (KR); Myongji University Industry And Academia Cooperation Foundation, Yongin-si (KR)

( * ) Notice: Subject to any disclaimer, the term of this patent is extended or adjusted under 35 U.S.C. 154(b) by 238 days.

(21) Appl. No.: 17/060,702

(22) Filed: Oct. 1, 2020

(65) Prior Publication Data

US 2021/0198401 A1    Jul. 1, 2021

(30) Foreign Application Priority Data

Dec. 31, 2019   (KR) .......................... 10-2019-0179804

(51) Int. Cl.
   *C08F 220/18*   (2006.01)
   *C09J 133/08*   (2006.01)
   (Continued)

(52) U.S. Cl.
   CPC ...... *C08F 220/1808* (2020.02); *C07F 7/1804* (2013.01); *C07F 7/28* (2013.01);
   (Continued)

(58) Field of Classification Search
   CPC .... C08K 3/22; C08K 3/34; C08K 2003/2227; C08K 5/0091; C08K 9/04; C08K 9/06;
   (Continued)

(56) References Cited

U.S. PATENT DOCUMENTS

| 2014/0295183 A1 | 10/2014 | Yamagata et al. |
| 2015/0020957 A1 | 1/2015 | Masuda et al. |

(Continued)

FOREIGN PATENT DOCUMENTS

| KR | 10-1191906 | 10/2012 |
| KR | 10-2014-0118892 | 10/2014 |

(Continued)

*Primary Examiner* — Zachary M Davis
(74) *Attorney, Agent, or Firm* — H.C. Park & Associates, PLC

(57) ABSTRACT

A curable composition for an electronic device, includes a curable material; and an oxide-containing complex; wherein the oxide-containing complex includes i) an oxide core and ii) an organic group chemically bound to an atom on a surface of the oxide core, the organic group includes a) a curable group reactable with the curable material and b) a linking group linking the atom on a surface of the oxide core to the curable group, and the oxide core includes an aluminum oxide, a silicon oxide, or a combination thereof.

18 Claims, 5 Drawing Sheets

(51) Int. Cl.
  *C07F 7/18* (2006.01)
  *C07F 7/28* (2006.01)
  *C08J 5/18* (2006.01)

(52) U.S. Cl.
  CPC ............... *C08J 5/18* (2013.01); *C09J 133/08* (2013.01); *C08J 2333/08* (2013.01)

(58) Field of Classification Search
  CPC ...... C09J 133/00; C09J 133/04; C09J 133/06; C09J 133/08; C09J 133/10
  See application file for complete search history.

(56) References Cited

U.S. PATENT DOCUMENTS

| | | |
|---|---|---|
| 2015/0159036 A1 | 6/2015 | Murugesan et al. |
| 2019/0218434 A1 | 7/2019 | Liu et al. |
| 2019/0309181 A1 | 10/2019 | Lyon et al. |

FOREIGN PATENT DOCUMENTS

| | | |
|---|---|---|
| KR | 10-2016-0096628 | 8/2016 |
| KR | 10-2017-0111621 | 10/2017 |
| KR | 10-2019-0045908 | 5/2019 |
| KR | 10-2019-0053227 | 5/2019 |

CURABLE COMPOSITION, METHOD OF PREPARING CURABLE COMPOSITION, CURED MATERIAL OF CURABLE COMPOSITION, METHOD OF PREPARING CURED MATERIAL, AND ELECTRONIC DEVICE INCLUDING CURED MATERIAL

CROSS REFERENCE TO RELATED APPLICATION

This application claims priority from and the benefit of Korean Patent Application No. 10-2019-0179804, filed on Dec. 31, 2019, which is hereby incorporated by reference for all purposes as if fully set forth herein.

BACKGROUND

Field

Exemplary implementations of the invention relate generally to a curable composition and, more specifically, to a method of preparing the curable composition, a cured material of the curable composition, a method of preparing the cured material, and an electronic device including the cured material.

Discussion of the Background

Adhesive members that may be used for various purposes in various electronic devices are required to exhibit satisfactory performance in terms of optical properties, adhesive properties, durability, and the like.

In recent years, there has been active development of flexible, foldable and/or rollable articles and/or electronic devices.

The above information disclosed in this Background section is only for understanding of the background of the inventive concepts, and, therefore, it may contain information that does not constitute prior art.

SUMMARY

During development of flexible, foldable and/or rollable electronic devices (for example, display devices), Applicant realized there is a need for developing an adhesive member for use in flexible electronic devices that easily deforms upon application of an external force, such as bending and/or distortion, while also having excellent resilience upon removal of the external force.

Electronic devices and articles made according to the principles and exemplary implementations of the invention include a cured material made from a curable composition having excellent optical properties, elastic force, flexibility, and resilience.

Advantageous methods of preparing the curable composition, and methods of preparing the cured material according to the principles and exemplary implementations of the invention are especially advantageous for use in electronic devices and articles.

Additional features of the inventive concepts will be set forth in the description which follows, and in part will be apparent from the description, or may be learned by practice of the inventive concepts.

According to one aspect of the invention, a curable composition for an electronic device includes a curable material; and an oxide-containing complex; wherein the oxide-containing complex includes i) an oxide core and ii) an organic group chemically bound to an atom on a surface of the oxide core, the organic group includes a) a curable group reactable with the curable material and b) a linking group linking the atom on a surface of the oxide core to the curable group, and the oxide core includes an aluminum oxide, a silicon oxide, or a combination thereof. The oxide core has a diameter D15 of about 1 nm to about 50 nm.

The oxide core may have a refractive index of about 1.2 to about 2.5.

The organic group may be of Formula 1:

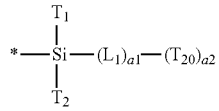

Formula 1 wherein, in Formula 1, $L_1$ may be:

*—$N(R_{11})$—*', *—O—*', *—S—*', or *—$C(=O)$—*';

or a $C_1$-$C_{60}$ alkylene group, a $C_1$-$C_{60}$ oxyalkylene group, a $C_6$-$C_{60}$ arylene group, or a $C_6$-$C_{60}$ oxyarylene group, each optionally substituted with deuterium, a hydroxyl group, a $C_1$-$C_{20}$ alkyl group, a $C_1$-$C_{20}$ alkoxy group, a phenyl group, a biphenyl group, or any combination thereof;

* and *' each may indicate a binding site to an adjacent atom;

$R_{11}$ may be hydrogen, deuterium, a hydroxyl group, a $C_1$-$C_{20}$ alkyl group, a $C_1$-$C_{20}$ alkoxy group, a phenyl group, or a biphenyl group;

a1 may be an integer from 1 to 10,000, and when a1 may be 2 or greater, at least two $L_1$(s) may be identical to or different from each other;

$T_{20}$ may be a curable group;

a2 may be an integer from 1 to 10, and when a2 may be 2 or greater, at least two $T_{20}$(s) may be identical to or different from each other; and $T_1$ and $T_2$ may be each, independently from one another, hydrogen, deuterium, a hydroxyl group, a $C_1$-$C_{20}$ alkyl group, a $C_1$-$C_{20}$ alkoxy group, a phenyl group, a biphenyl group, an oxygen atom bound to a silicon atom in an adjacent linking group, or a binding site to oxygen disposed between the linking group and an adjacent linking group;

wherein in Formula 1, * may indicate a binding site to the atom on a surface of the oxide core.

The T20 curable group may be a group of Formulae 1-2(1) to 1-2(8), as defined herein.

The oxide core and the organic group in the oxide-containing complex may have a weight ratio between about 10:1 to about 1:10.

The curable material may have a refractive index of about 1.2 to about 2.0.

The difference between a refractive index of the curable material and a refractive index of the oxide core may be about 0.01 to about 0.5.

According to another aspect of the invention, a method of preparing a curable composition for an electronic device includes the steps of: providing an oxide-containing complex including i) an oxide core and ii) an organic group chemically bound to an atom on a surface of the oxide core; and mixing the oxide-containing complex with a curable material to provide a curable composition including the oxide-containing complex and the curable material; wherein the organic group includes a) a curable group reactable with the curable material and b) a linking group linking the atom on a surface of the oxide core to the curable group; and the oxide core includes an aluminum oxide, a silicon oxide, or a combination thereof.

The step of generating the oxide-containing complex include reacting an oxide precursor with a compound of Formula 2:

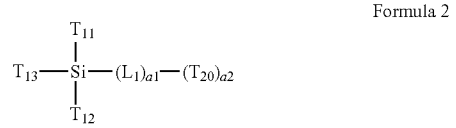

Formula 2 wherein, in Formula 2, the variables are defined herein.

The cured material may include the curable composition as described above.

The cured material may include a matrix material derived from the curable material, and the atom on a surface of the oxide core in the oxide-containing complex may be chemically bound to the matrix material via i) a residue group derived from a reaction between the curable group in the oxide-containing complex and the curable material, and ii) the linking group in the oxide-containing complex.

The matrix material may include an adhesive material.

The cured material may include a film.

The film may have a thickness of about 0.1 μm to about 700 μm.

The light transmittance with respect to light having a maximum emission wavelength of 600 nm may be about 96% or higher.

A method of preparing a cured material for an electronic device may include the steps of providing the curable composition as described above on a substrate; and curing the curable composition.

The step of curing of the curable composition may include exposing the curable composition to ultraviolet rays.

An electronic device may include the cured material as described above.

The electronic device may include a flexible, foldable, or rollable electronic device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
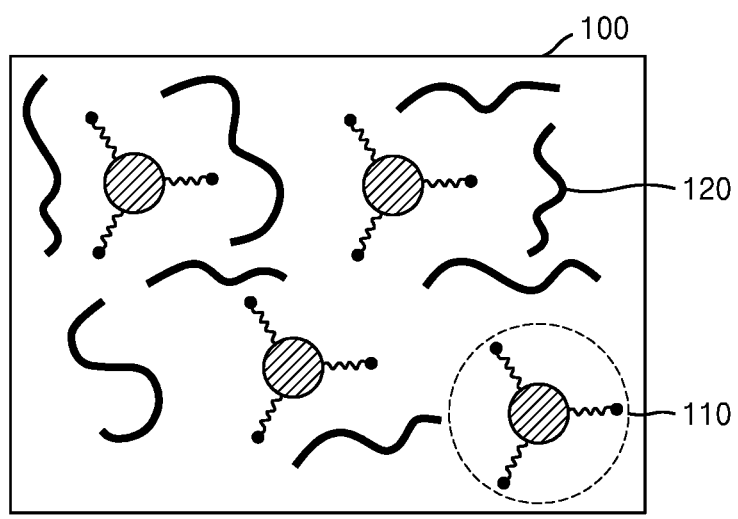
FIG. 1 is a schematic diagram of an exemplary embodiment of a curable composition made according to principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

As used herein, the term "nanometer" may be abbreviated "nm".

As used herein, the term "micrometers" may be abbreviated "µm".

As used herein, the term "percent" may be abbreviated "%".

The terms "hydrogen" and "deuterium" refer to their respective atoms and corresponding radicals, and the terms "—F, —Cl, —Br, and —I" are radicals of, respectively, fluorine, chlorine, bromine, and iodine.

As used herein, the term "atom" may mean an element or its corresponding radical bonded to one or more other atoms.

As used herein, a substituent for a monovalent group, e.g., alkyl, may also be, independently, a substituent for a corresponding divalent group, e.g., alkylene.

Figure 2:
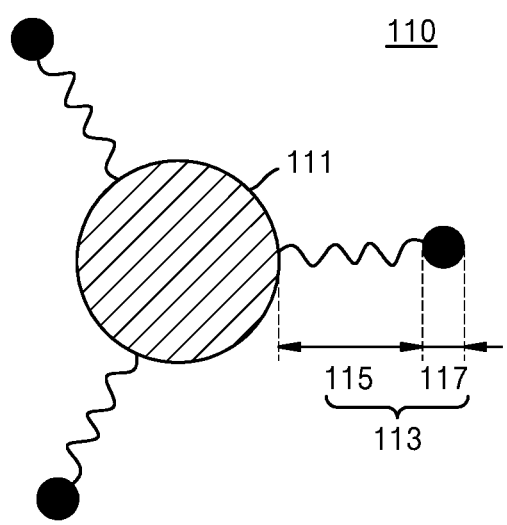
FIG. 2 is a schematic diagram of an exemplary embodiment of an oxide-containing complex of FIG. 1.
Figure 3:
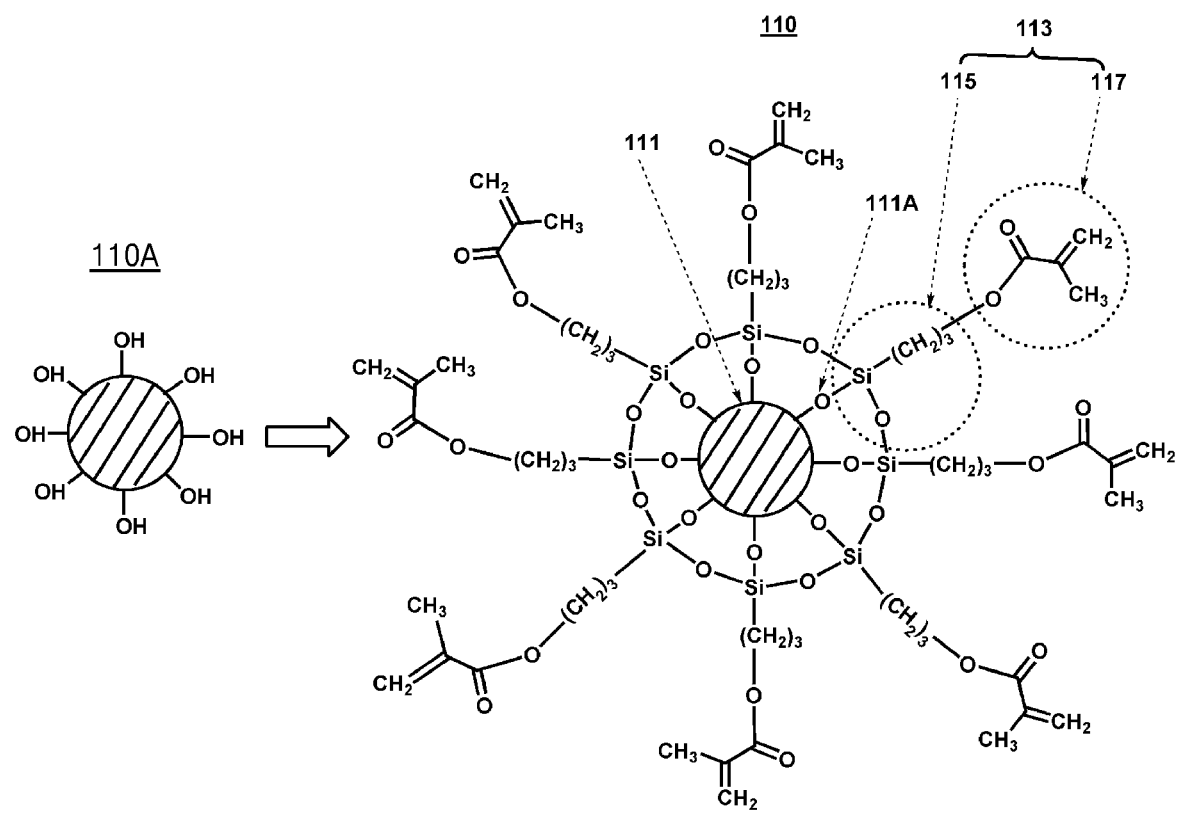
FIG. 3 is a schematic diagram of an exemplary embodiment of a method of preparing an oxide-containing complex according to principles of the invention.
Figure 4:
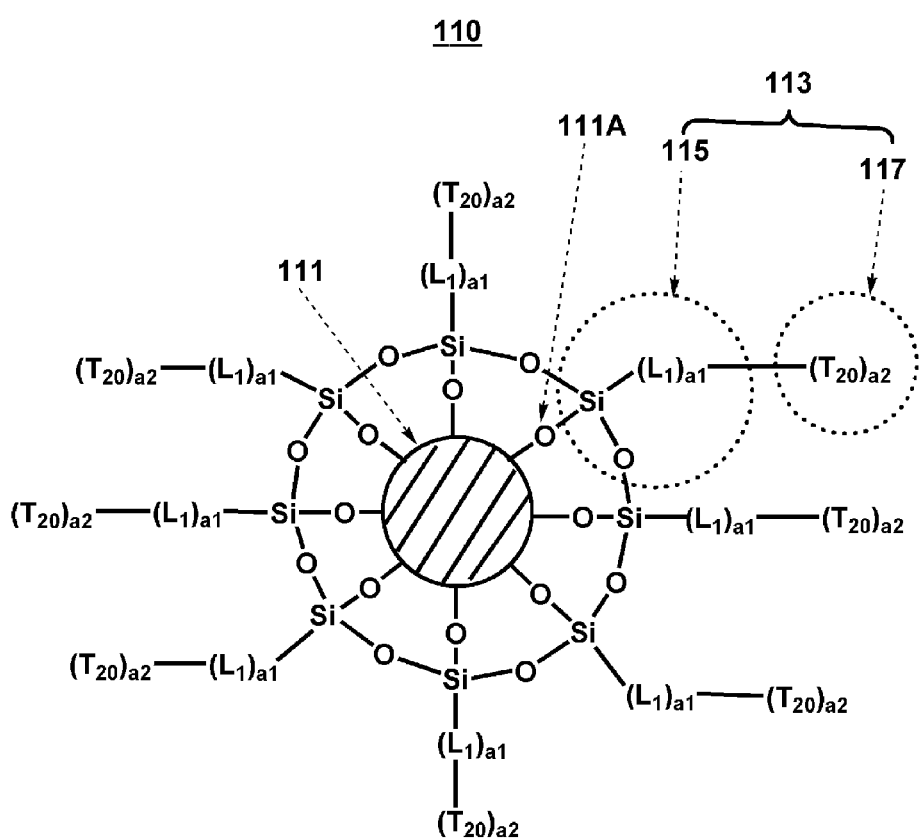
FIG. 4 is a schematic diagram of another exemplary embodiment of an oxide-containing complex constructed according to principles of the invention.
Figure 5:
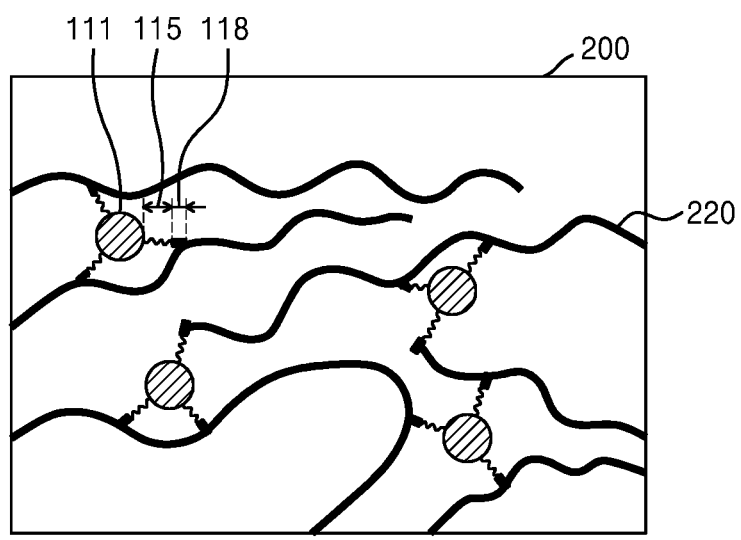
FIG. 5 is a schematic diagram of an exemplary embodiment of a cured material made according to principles of the invention.

FIG. 1 is a schematic diagram of an exemplary embodiment of a curable composition made according to principles of the invention. FIG. 2 is a schematic diagram of an exemplary embodiment of an oxide-containing complex of FIG. 1. FIG. 3 is a schematic diagram of an exemplary embodiment of a method of preparing an oxide-containing complex according to principles of the invention. FIG. 4 is a schematic diagram of another exemplary embodiment of an oxide-containing complex constructed according to principles of the invention. FIG. 5 is a schematic diagram of an exemplary embodiment of a cured material made according to principles of the invention.

A curable composition 100 shown in FIG. 1 may include a curable material 120 and an oxide-containing complex 110. The oxide-containing complex 110 shown in FIGS. 2 to 4 may include i) an oxide core 111 and ii) an organic group 113 chemically bound to an atom 111A on a surface of the oxide core 111. The oxide-containing complex 110 may include at least one organic group 113. The organic group 113 in the oxide-containing complex 110 shown in FIGS. 2 to 4 may include a) a curable group 117 reactable with the curable material 120 and b) a linking group 115 linking the atom 111A on a surface of the oxide core 111 to the curable group 117.

By curing the curable composition 100 shown in FIG. 1, a cured material 200 shown in FIG. 5 may be prepared. The cured material 200 of FIG. 5 may include a matrix material 220 derived from the curable material 120 included in the curable composition 100. The atom 111A on a surface of the oxide-containing complex 110 included in the curable composition 100 may be "chemically bound" to the matrix material 220 via i) a residue group 118 derived from a reaction between the curable group 117 in the oxide-containing complex 110 and the curable material 120; and ii) the linking group 115 in the oxide-containing complex 110. Accordingly, the cured material 200 of FIG. 5 is different from a cured material in which a matrix material described above and an oxide core (e.g., a spherical oxide particle) are not "chemically bound to each other" and are "physically mixed" with each other (e.g., Film B).

As described above, the atom 111A on a surface of the oxide core 111 in the cured material 200 may be "firmly and chemically bound to" the matrix material 220. Thus, even when external force, such as bending and/or distortion, is removed after application of the external force to the cured material 200, the oxide core 111 may effectively serve as a structural supporter for restoring the initial shape of the cured material 200. Therefore, the cured material 200 may have excellent resilience.

Oxide-Containing Complex 110 in Curable Composition 100

The curable composition 100 of FIG. 1 may include the oxide-containing complex 110. The oxide core 111 in the oxide-containing complex 110 may include an aluminum oxide (e.g., $Al_2O_3$), a silicon oxide (e.g., $SiO_2$), or a combination thereof. Because the oxide core 111 includes an aluminum oxide, a silicon oxide, or a combination thereof, the cured material 200 of FIG. 5 may have excellent optical properties (e.g., light transmittance, refractive index, or the like).

For example, the oxide core 111 may be an aluminum oxide or a silicon oxide. In some exemplary embodiments, the oxide core 111 may be a silicon oxide. In one or more exemplary embodiments, the atom 111A on a surface of the oxide core 111 may be oxygen. The oxide core 111 may be a spherical particle.

For example, the diameter D15 of the oxide core 111 may be in a range of about 1 nm to about 50 nm, about 1 nm to about 30 nm, or about 15 nm to about 25 nm. The refractive index of the oxide core 111 may be in a range of about 1.2 to about 2.5, about 1.2 to about 2.0, about 1.2 to about 1.8, or about 1.3 to about 1.8.

Because the diameter D15 and/or the refractive index of the oxide core 111 is within any of these ranges described above, the cured material 200 of FIG. 5 may have excellent optical properties (e.g., light transmittance, refractive index, or the like). The diameter D15 may be measured by evaluating a particle size distribution curve using any suitable commercially available particle size analyzer and evaluating the diameter corresponding to 15% of a passing mass percentage.

The oxide-containing complex 110 in FIGS. 2 to 4 may include at least one organic group 113.

In an exemplary embodiment, the organic group 113 may be represented by Formula 1:

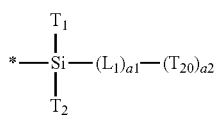

Formula 1 wherein, in Formula 1, $L_1$ may be:

*—N($R_{11}$)—*', *—O—*', *—S—*', or *—C(=O)—*';

or a $C_1$-$C_{60}$ alkylene group, a $C_1$-$C_{60}$ oxyalkylene group, a $C_6$-$C_{60}$ arylene group, or a $C_6$-$C_{60}$ oxyarylene group, each unsubstituted or substituted with deuterium, a hydroxyl group, a $C_1$-$C_{20}$ alkyl group, a $C_1$-$C_{20}$ alkoxy group, a phenyl group, a biphenyl group, or any combination thereof,

* and *' may each indicate a binding site to an adjacent atom, $R_{11}$ may be hydrogen, deuterium, a hydroxyl group, a $C_1$-$C_{20}$ alkyl group, a $C_1$-$C_{20}$ alkoxy group, a phenyl group, or a biphenyl group, a1 may be an integer from 1 to 10,000 (for example, an integer from 1 to 5,000 or an integer from 1 to 1,000), and when a1 is 2 or greater, at least two $L_1$(s) may be identical to or different from each other, $T_{20}$ may be the curable group 117, a2 may be an integer from 1 to 10, and when a2 is 2 or greater, at least two $T_{20}$(s) may be identical to or different from each other, and $T_1$ and $T_2$ may each independently be hydrogen, deuterium, a hydroxyl group, a $C_1$-$C_{20}$ alkyl group, a $C_1$-$C_{20}$ alkoxy group, a phenyl group, a biphenyl group, oxygen bound to silicon in an adjacent linking group, or a binding site to oxygen disposed between the linking group and an adjacent linking group, wherein in Formula 1, * indicates a binding site to the atom 111A on a surface of the oxide core 111.

The curable group 117 in the oxide-containing complex 110 and $T_{20}$ in Formula 1 may be any suitable group that may react with the curable material 120 in the curable composition 100 upon curation.

For example, the curable group 117 in the oxide-containing complex 110 and $T_{20}$ in Formula 1 may comprise a vinyl-based group, an acrylate-based group, an acrylamide-based group, an epoxy-based group, or any combination thereof.

In an exemplary embodiment, the curable group 117 in the oxide-containing complex 110 and $T_{20}$ in Formula 1 may be a group represented by one of Formulae 1-2(1) to 1-2(8):

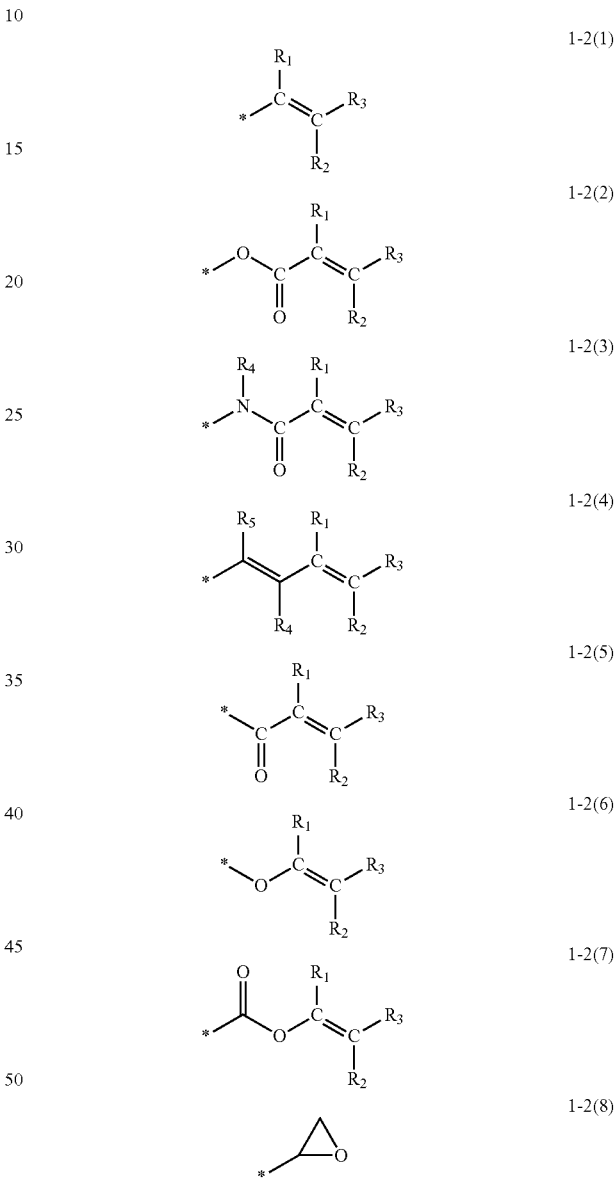

wherein, in Formulae 1-2(1) to 1-2(8), $R_1$ to $R_5$ may each independently be hydrogen, deuterium, a hydroxyl group, a $C_1$-$C_{20}$ alkyl group, a $C_1$-$C_{20}$ alkoxy group, a phenyl group, or a biphenyl group, and

* may indicate a binding site to the linking group 115.

The organic group 113 in the oxide-containing complex 110 may include the linking group 115. Accordingly, the cured material 200 in FIG. 5 may have improved elastic force, flexibility, and/or resilience.

The linking group 115 may be any suitable group that links the atom 111A on a surface of the oxide core 111 to the curable group 117.

For example, referring to Formula 1, the linking group 115 may be a group represented by Formula 1-1:

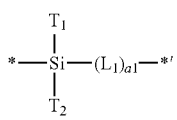

Formula 1-1 wherein, in Formula 1-1, $L_1$, a1, $T_1$, $T_2$, and * may respectively be understood by referring to the descriptions of $L_1$, a1, $T_1$, $T_2$, and * provided herein, and *' may indicate a binding site to the curable group 117 in the oxide-containing complex 110 or $T_{20}$ in Formula 1.

For example, in the oxide-containing complex 110 shown in FIG. 4, the atom 111A on a surface of the oxide core 111 is oxygen. In addition, the linking group 115 in the oxide-containing complex 110 shown in FIG. 4 may be a group represented by Formula 1-1 in which $T_1$ may be a binding site to oxygen disposed between the linking group and an adjacent linking group, $T_2$ may be oxygen bound to silicon in an adjacent linking group, $L_1$ may be a propylene group, and a1 may be 1, and the curable group 117 (or $T_{20}$ in Formula 1) may be a group represented by Formula 1-2(2) in which $R_1$ may be a methyl group, and R2 and R3 may each be hydrogen.

In some exemplary embodiments, although not seen in FIG. 4, the linking group 115 in the oxide-containing complex 110 shown in FIG. 4 may be a group represented by Formula 1-1 in which $T_1$ may be a binding site to oxygen disposed between the linking group and an adjacent linking group, $T_2$ may be oxygen bound to silicon in an adjacent linking group, $L_1$ may be an oxypropylene group, and a1 may be 1, and the curable group 117 (or $T_{20}$ in Formula 1) may be a group represented by Formula 1-2(5) in which $R_1$ may be a methyl group, and R2 and R3 may each be hydrogen.

The weight ratio between the oxide core 111 and the organic group 113 in the oxide-containing complex 110 may be in a range of about 10:1 to about 1:10, for example, about 7:1 to about 1:7. In some exemplary embodiments, the weight ratio between the oxide core 111 and the organic group 113 in the oxide-containing complex 110 may be in a range of about 1:1 to about 1:5, for example, about 1:1 to about 1:3. When the weight ratio between the oxide core 111 and the organic group 113 in the oxide-containing complex 110 is within any of these ranges described above, the cured material 200 of FIG. 5 may have excellent elastic force, flexibility, and/or resilience as well as excellent optical properties.

Curable Material 120 in Curable Composition 100

The curable material 120 in the curable composition 100 shown in FIG. 1 may be any suitable material that may change to the matrix material 220 in the cured material 200 shown in FIG. 5 through a curing process. The curable material 120 may consist of one type of compound or may be a mixture of at least two different types of compounds. The refractive index of the curable material 120 may be in a range of about 1.2 to about 2.0, about 1.2 to about 1.7, about 1.2 to about 1.5, or about 1.3 to about 1.5. Because the refractive index of the oxide material 120 is within any of these ranges described above, the cured material 200 of FIG. 5 may have excellent optical properties (e.g., light transmittance, refractive index, or the like). For example, the curable material 120 may be photopolymerizable monomer(s).

In an exemplary embodiment, the curable material 120 may be acrylic monomer(s). When the curable material 120 is acrylic monomer(s), the matrix material 220 in the cured material 200 of FIG. 5 may be a polymer polymerized through a curing process (e.g., a photopolymerization process) of the acrylic monomer(s).

Examples of the acrylic monomer include monofunctional (meth)acrylate monomers such as 2-ethylphenoxy (meth)acrylate, 2-ethylthiophenyl(meth)acrylate, phenyl (meth)acrylate, biphenylmethyl(meth)acrylate, benzyl (meth)acrylate, 2-phenylethyl(meth)acrylate, 3-phenylpropyl(meth)acrylate, 4-phenylbutyl(meth)acrylate, 2-2-methylphenylethyl(meth)acrylate, 2-3-methylphenylethyl(meth)acrylate, 2-4-methylphenylethyl(meth)acrylate, 2-(4-propylphenyl)ethyl(meth)acrylate, 2-(4-(1-methylethyl)phenyl)ethyl(meth)acrylate, 2-(4-methoxyphenyl)ethyl(meth)acrylate, 2-(4-cyclohexylphenyl)ethyl(meth)acrylate, 2-(2-chlorophenyl)ethyl(meth)acrylate, 2-(3-chlorophenyl)ethyl(meth)acrylate, 2-(4-chlorophenyl)ethyl(meth)acrylate, 2-(4-bromophenyl)ethyl(meth)acrylate, 2-(3-phenylphenyl)ethylmeth)acrylate, 2-(4-benzylphenyl)ethyl(meth)acrylate, o-phenylphenoxyethylacrylate, and isobornyl acrylate; difunctional (meth)acrylate monomers such as dicyclopentanyl di(meth)acrylate, caprolactone-modified dicyclopentenyl di(meth)acrylate, allylated cyclohexyl di(meth)acrylate, tricyclodecandimethanol(meth)acrylate, dimethylol dicyclopentane di(meth)acrylate, tricyclodecan dimethanol(meth)acrylate, 9,9-bis[4-(2-acryloyloxyethoxy)phenyl]fluorene, bisfluorene diacrylate, bisphenol-modified fluorene diacrylate, phenyl-modified urethane diacrylate, and bisfluorene-modified urethane diacrylate; trifunctional or polyfunctional (meth)acrylate monomers such as trimethylol propane tri(meth)acrylate, ethoxylated-trimethylolpropane tri(meth)acrylate, propoxylated-trimethylolpropane tri(meth)acrylate, tris2-hydroxyethylisocyanurate tri(meth)acrylate, glycerin tri(meth)acrylate, pentaerythritol tri(meth)acrylate, dipentaerythritol tri(meth)acrylate, ditrimethylolpropane tri(meth)acrylate, pentaerythritol tetra(meth)acrylate, ditrimethylolpropane tetra(meth)acrylate, dipentaerythritol tetra(meth)acrylate, dipentaerythritol penta(meth)acrylate, ditrimethylolpropane penta(meth)acrylate, dipentaerythritol hexa(meth)acrylate, and ditrimethylolpropane hexa(meth)acrylate; or any combination thereof.

In some exemplary embodiments, examples of the acrylic monomer include Compound 1 (2-ethylhexyl acrylate), Compound 2 (butyl acrylate), Compound 3 (vinyl acetate), Compound 4 (methyl methacrylate), Compound 5 (ethyl acrylate), Compound 6 (methyl acrylate), Compound 7 (benzyl acrylate), Compound 8 (phenoxyethyl acrylate), Compound 9 (acrylic acid), Compound 10 (hydroxyethyl methacrylate), Compound 11 (glycidyl methacrylate), Compound 12 (acetoacetoxyethyl methacrylate), and Compound 13 (2-hydroxyethyl acrylate):

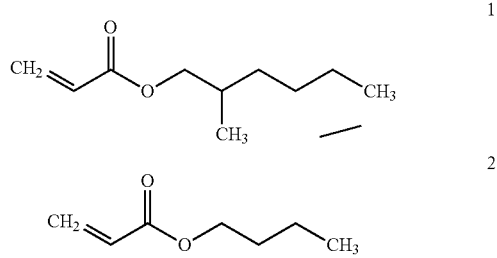

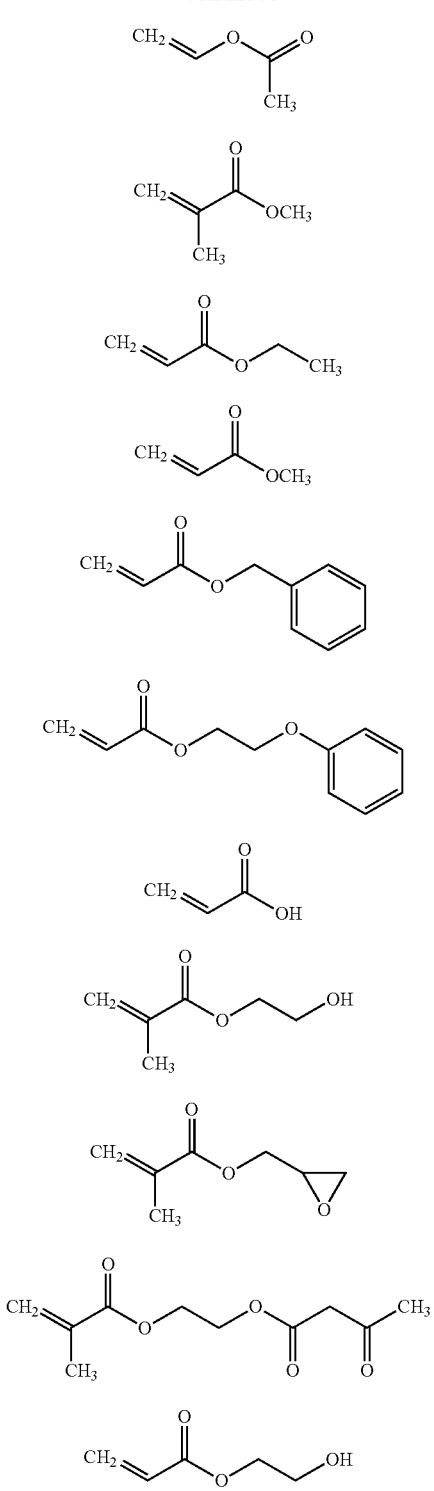

The amount of the curable material 120 in the curable composition 100 shown in FIG. 1 may be in a range of about 10 parts to about 99.5 parts by weight, about 50 parts to about 99 parts by weight, or about 70 parts to about 98 parts by weight, based on 100 parts by weight of the curable composition 100. When the amount of the curable material 120 is within any of these ranges described above, an exposed portion may be effectively formed during exposure for curing the curable composition 100 to form the cured material 200 having excellent strength.

Curable Composition 100

The curable composition 100 of FIG. 1 may include the oxide-containing complex 110 described above and the curable material 120. The amount of the oxide-containing complex 110 in the curable composition 100 of FIG. 1 may be in a range of about 0.01 parts to about 20 parts by weight, about 0.1 parts to about 10 parts by weight, or about 0.5 parts to about 5 parts by weight, based on 100 parts by weight of the curable material 120. When the amount of the oxide-containing complex 110 is within any of these ranges described above, the cured material 200 of FIG. 5 may have excellent elastic force, flexibility, and/or resilience as well as excellent optical properties.

In an exemplary embodiment, the difference (an absolute value) in the refractive index between the curable material 120 and the oxide core 111 may be in a range of about 0.01 to about 0.5, about 0.01 to about 0.4, or about 0.02 to about 0.3. In one or more exemplary embodiments, the refractive index of the curable material 120 may be smaller than a refractive index of the oxide core 111.

When the refractive index of the curable material 120 and the refractive index of the oxide core 111 are within any of these ranges described above, multiple reflection and/or scattering of light incident on the cured material 200 of FIG. 5 may be effectively induced, thereby allowing manufacture of the cured material 200 having excellent optical properties.

The term "refractive index" as used herein refers to an absolute refractive index with respect to D-line ($\lambda$=589 nm, yellow) of sodium (Na). For example, the term "refractive index" may be an absolute refractive index measured at a temperature of 25° C. and in a relative humidity of 50% with light of the wavelength of 589 nm by using a refractive index measurer (e.g., ellipsometer (sold under the trade designation M-2000 Ellipsometer by J. A. Woollam of Lincoln, Nebr.)), for example, according to the Cauchy Film Model.

The term "refractive index of the curable material 120" refers to 1) when the curable material 120 consists of one type of compound, the refractive index of the one type of compound or 2) when the curable material 120 is a mixture of at least two different types of compounds, a refractive index of a compound having a greatest amount from the at least two different types of compounds. For example, i) when the curable material 120 is a mixture of Compounds A, B, and C, ii) when Compounds A, B, and C respectively have an amount (parts by weight) of a, b, and c, and iii) when a>b>c, a refractive index of the curable material 120 may be a refractive index of Compound A.

When the curable material 120 is a mixture of at least two different types of compounds, and two or more compounds have the greatest amount from among the at least two different types of compounds, the refractive index of the curable material 120 may be an average value of refractive indexes of the compounds having the greatest amount. For example, i) when the curable material 120 is a mixture of Compounds A, B, and C, ii) when Compounds A, B, and C respectively have an amount (parts by weight) of a, b, and c, and iii) when a=b>c, the refractive index of the curable material 120 may be an average value of the refractive index of Compound A and the refractive index of Compound B.

Table 1 shows refractive indexes of 2-ethylhexyl acrylate, isobornyl acrylate, acrylic acid, methyl methacrylic acid, and 2-hydroxyethylacrylate, which are exemplary embodiments of the curable material 120, respectively; $Al_2O_3$ and $SiO_2$, which are exemplary embodiments of the oxide core 111, respectively; and $TiO_2$ used in Film A described herein.

TABLE 1

| | Material | Refractive Index |
|---|---|---|
| Curable Material 120 | 2-Ethylhexyl acrylate (Compound 1) | 1.43 |
| | Isobornyl acrylate | 1.47 |
| | Acrylic acid (Compound 9) | 1.39 |
| | Methyl methacrylate (Compound 4) | 1.49 |
| | 2-Hydroxyethyl acrylate (Compound 13) | 1.45 |
| Oxide Core 111 | $Al_2O_3$ | 1.76 |
| | $SiO_2$ | 1.45 |
| | $TiO_2$ | 2.61 |

For example, as shown in Table 1, since $SiO_2$, i.e., the oxide core 111, has a refractive index of 1.45, and 2-ethylhexyl acrylate having the greatest amount (60 parts by weight based on 100 parts by weight of "Curable Composition 1") among the curable materials 120 has a refractive index of 1.43 in "Curable Composition 1", the difference between a refractive index of the curable material 120 and the refractive index of the oxide core 111 in "Curable Composition 1" is 0.02, and the refractive index of the curable material 120 is smaller than the refractive index of the oxide core 111 in "Curable Composition 1".

The curable composition 100 may further include any suitable polymerization initiator that may polymerize the curable material 120 described above, e.g., any suitable photopolymerization initiator.

From the viewpoint of polymerization characteristics, initiation efficiency, absorption wavelength, availability, and price, the photopolymerization initiator may be an acetophenone-based compound, a benzophenone-based compound, a triazine-based compound, a biimidazole-based compound, an oxime-based compound, a thioxanthone-based compound, or any combination thereof.

Examples of the acetophenone-based compound include diethoxyacetophenone, 2-hydroxy-2-methyl-1-phenylpropane-1-one, benzyldimethyl ketal, 2-hydroxy-1-[4-(2-hydroxyethoxy)phenyl]-2-methylpropane-1-one, 1-hydroxycyclohexylphenylketone, 2-methyl-1-(4-methylthiophenyl)-2-morpholinopropane-1-one, 2-benzyl-2-dimethylamino-1-(4-morpholinophenyl)butane-1-one, 2-hydroxy-2-methyl-1-[4-(1-methylvinyl)phenyl]propane-1-one, 2-(4-methylbenzyl)-2-(dimethylamino)-1-(4-morpholinophenyl)butane-1-one, hydroxydimethyl acetophenone, and the like.

Examples of the benzophenone-based compound include benzophenone, o-benzoyl benzoic acid methyl, 4-phenyl benzophenone, 4-benzoyl-4'-methyl diphenyl sulfide, 3,3',4,4'-tetra(tert-butylperoxycarbonyl)benzophenone, 2,4,6-trimethylbenzophenone, and the like.

Examples of the triazine-based compound include 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-piperonyl-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methylphenyl)ethenyl]-1,3,5-triazine, 2,4-bis(trichloromethyl)-6-[2-(3,4-dimethoxyphenyl)ethenyl]-1,3,5-triazine, and the like.

Examples of the biimidazole-based compound include 2,2'-bis(2-chlorophenyl)-4,4',5,5'-tetraphenylbiimidazole, 2,2'-bis(2,3-dichlorophenyl)-4,4',5,5'-tetraphenylbiimidazole, 2,2'-bis(2-chlorophenyl)-4,4',5,5'-tetra(alkoxyphenyl)biimidazole, 2,2'-bis(2-chlorophenyl)-4,4',5,5'-tetra(trialkoxyphenyl)biimidazole, 2,2-bis(2,6-dichlorophenyl)-4,4',5,5'-tetraphenyl-1,2'-biimidazole, an imidazole compound in which phenyl groups at positions of 4,4',5,5' are substituted with carboalkoxy groups, and the like.

Examples of the oxime-based compound include o-ethoxycarbonyl-α-oxyimino-1-phenylpropane-1-one and the like. Examples of the thioxanthone-based compound include 2-isopropylthioxanthone, 2,4-diethylthioxanthone, 2,4-dichlorothioxanthone, 1-chloro-4-propoxythioxanthone, and the like.

Examples of the commercially available photopolymerization initiators include those sold under trade designations Irgacure-907, Irgacure 184, Irgacure 819, Irgacure 250, Darocur 1173, Irgacure OXE 01, and Irgacure OXE 02 (available from BASF of Ludwigshafen, Germany), sold under trade designations WPI-113, WPI-116, WPI-169, WPI-170, WPI-124, WPAG-638, WPAG-469, WPAG-370, WPAG-367, and WPAG-336 (available from Wako Pure Chemical Industries, Ltd. of Osaka, Japan), sold under trade designations B2380, B2381, C1390, D2238, D2248, D2253, 10591, T1608, T1609, T2041, and T2042 (available from Tokyo Kasei Kogyo Co., Ltd. of Yamatokoriyama, Japan), sold under trade designations AT-6992 and At-6976 (available from ACETO of Port Washington, N.Y.), sold under trade designations CPI-100, CPI-100P, CPI101A, CPI-200K, and CPI-210S (available from San-Apro Ltd. of Kyoto, Japan), sold under trade designations SP-056, SP-066, SP-130, SP-140, SP-150, SP-170, SP-171, and SP-172 (available from ADEKA Corporation, of Tokyo, Japan), sold under trade designations CD-1010, CD-1011, and CD-1012 (available from Sartomer Company, Inc. of Exton, Pa.), sold under trade designations San Aid SI-60, SI-80, SI-100, SI-60L, SI-80L, SI-100L, SI-L145, SI-L150, SI-L160, SI-L110, and SI-L147 (available from Sanshin Kagaku Kogyo Co., Ltd. of Nagoya, Japan), sold under the trade designation PI2074 (available from Rhodia S.A. of La Defense, France), and hydroxydimethyl acetophenone available from Millipore Sigma with majority ownership by Merck KGaA, Darmstadt, Germany.

The amount of the photopolymerization initiator may be in a range of about 0.1 parts to 10 parts by weight, 0.5 parts to 5 parts by weight, or 0.5 parts to 3 parts by weight, based on 100 parts by weight of the curable composition 100. When the amount of the photopolymerization initiator is within any of these ranges described above, an exposed portion may be effectively formed during exposure for curing the curable composition 100 to form the cured material 200 having excellent strength.

The curable composition 100 may consist of the curable material 120, the oxide-containing complex 110, and the photopolymerization initiator described above. In some exemplary embodiments, the curable composition 100 may further include any suitable solvent that is miscible with the curable material 120 and the oxide-containing complex 110 described above.

Examples of the curable composition 100 include solvents including alkyleneglycol alkylethers such as ethyleneglycol monomethylether, ethyleneglycol monoethylether, ethyleneglycol monopropylether, ethyleneglycol monobutylether, propyleneglycol monomethylether, propyleneglycol methylethylether, and the like; diethyleneglycol dialkylethers such as diethyleneglycol dimethylether, diethyleneglycol diethylether, diethyleneglycol dipropylether, diethyleneglycol dibutylether, and the like; alkyleneglycol alkyletheracetates such as methylcellosolveacetate, ethylcellosolveacetate, propyleneglycol monomethyletheracetate, propyleneglycol monoethyletheracetate, propyleneglycol monopropyletheracetate, and the like; alkoxy alkylacetates such as methoxybutylacetate, methoxypentylacetate, and the like; aromatic hydrocarbons such as benzene, toluene, xylene, mesitylene, and the like; ketones such as methylethylketone, acetone, methylamylketone, methylisobutylketone, cyclohexanone, and the like; alcohols such as ethanol, propanol, butanol, hexanol, cyclohexanol, ethyleneglycol, glycerin, and the like; esters such as 3-ethoxypropionate ethyl ester, 3-methoxypropionate methyl ester, 3-phenylpropionate ethyl ester, and the like; cyclic esters such as γ-butyrolactone and the like; or any combination thereof.

The amount of the solvent may be in a range of about 20 parts to about 70 parts by weight, for example, about 30 parts to about 60 parts by weight, based on 100 parts by weight of the curable composition 100. When the amount of the solvent is within any of these ranges described above, the curable composition 100 may have an excellent viscosity, while maintaining high dispersibility of solid in the curable composition 100.

The curable composition 100 may further include an alkali soluble resin, a dispersant, or any combination thereof, in addition to the curable material 120, the oxide-containing complex 110, the polymerization initiator, and the solvent described above. The alkali soluble resin may serve to alkali-solubilize an unexposed portion to enable removal of the unexposed portion and to remain an exposed portion after exposure of the curable composition 100, and to uniformly disperse the oxide-containing complex 110 in the curable composition 100. The alkali soluble resin may be selected from those having an acid value in a range of about 50 to about 200 (KOH mg/g). The term "acid value" as used herein refers to a measured value of a needed amount, typically milligrams (mg), of potassium hydroxide required for neutralizing 1 gram (g) of polymers and involves solubility. When the alkali soluble resin has an acid value within the range described above, excellent developing velocity, adhesiveness to substrate, and storage stability of the curable composition 100 may be achieved.

The alkali soluble resin may be a polymer derived from a carboxyl group-containing unsaturated monomer, or a copolymer of a monomer having an unsaturated bond copolymerizable with the monomer, or any combination thereof. Examples of the carboxyl group-containing unsaturated monomer may include unsaturated monocarboxylic acid, unsaturated dicarboxylic acid, unsaturated tricarboxylic acid, or any combination thereof. Examples of the unsaturated monocarboxylic acid may include acrylic acid, methacrylic acid, crotonic acid, α-chloroacrylic acid, cinnamic acid, and the like. Examples of the unsaturated dicarboxylic acid may include maleic acid, fumaric acid, itaconic acid, citraconic acid, mesaconic acid, and the like. Examples of the unsaturated dicarboxylic acid include acid anhydrides (e.g., maleic anhydride, itaconic anhydride, citraconic anhydride, and the like). Further, the unsaturated dicarboxylic acid may be mono(2-(meth)acryloyloxy alkyl)ester thereof, e.g., mono(2-acryloyloxyethyl) succinate, mono(2-methacryloyloxyethyl) succinate, mono(2-acryloyloxyethyl) phtalate, mono(2-methacryloyloxyethyl) phtalate, or the like. The unsaturated dicarboxylic acid may be, for example, ω-carboxypolycaprolactone monoacrylate, ω-carboxypolycaprolactone monomethacrylate, or the like. The carboxyl group-containing monomer may be used alone or in combination of at least two types thereof.

In addition, the monomer copolymerizable with the carboxyl group-containing unsaturated monomer may include an aromatic vinyl compound, an unsaturated carboxylic acid ester compound, an unsaturated carboxylic acid amino alkylester compound, an unsaturated carboxylic acid glycidylester compound, a carboxylic acid vinylester compound, an unsaturated ether compound, a vinyl cyanide compound, an unsaturated amide compound, an unsaturated imide compound, an aliphatic conjugated diene compound, a macromonomer having a monoacryloyl group or a monomethacryloyl group at a terminus of a molecular chain, a bulky monomer, or any combination thereof.

The amount of the alkali soluble resin may be in a range of about 5 parts to about 80 parts by weight, for example, about 10 parts to about 70 parts by weight, based on 100 parts by weight of the curable composition 100. When the amount of the alkali soluble resin is within any of these ranges described above, film reduction of a pixel portion of an exposed portion upon development may be prevented, thus obtaining satisfactory omission of a non-pixel portion.

The dispersant may be used to enhance deagglomeration effect of the oxide-containing complex 110 in the curable composition 100. The dispersant may be a resin type dispersant, such as a phosphoric acid ester-based dispersant, a urethane-based dispersant, an acrylic dispersant, or the like. In particular, the commercially available dispersant may include sold under trade designations DISPER BYK-103, DISPER BYK-110, DISPER BYK-111, DISPER BYK-2000, DISPER BYK-2001, DISPER BYK-2011, DISPER BYK-2070, DISPER BYK-2150, DISPER BYK-160, DISPER BYK-161, DISPER BYK-162, DISPER BYK-163, DISPER BYK-164, and DISPER BYK-166 available from Byk-Chemie GmbH of Wesel, Germany.

The amount of the dispersant may be in a range of about 0.1 parts to about 15 parts by weight, for example, about 1 part to about 10 parts by weight, based on 100 parts by weight of the curable composition 100. When the amount of the dispersant is within any of these ranges described above, agglomeration of the oxide-containing complex 110 in the curable composition 100 may be substantially prevented.

In addition, the curable composition 100 may further include an adhesion promoter for increasing adhesion to a substrate, a surfactant for improving coating properties, an antioxidant, an ultraviolet absorber, or any combination.

Other Exemplary Embodiments of Curable Composition

According to some exemplary embodiments, a curable composition may include:
a curable material; and
an oxide-containing complex, wherein
the oxide-containing complex may include i) an oxide core and ii) an organic group chemically bound to an atom on a surface of the oxide core,
the organic group may include a) a curable group reactable with the curable material and b) a linking group linking the atom on a surface of the oxide core to the curable group, and the difference (an absolute value) between a refractive index of the curable material and a refractive index of the oxide core may be in a range of about 0.01 to about 0.5.

In some exemplary embodiments, the oxide-containing complex is as described herein. In some exemplary embodiments, the oxide included in the oxide core of the oxide-containing complex may be selected from any suitable oxides satisfying a refractive index difference range between a refractive index of the curable material and a refractive index of the oxide core. In some exemplary embodiments, the curable material is as described herein.

Method of Preparing Curable Composition 100

A method of preparing the curable composition 100 described above may include: providing the oxide-containing complex 110 including i) the oxide core 111 and ii) the organic group 113 chemically bound to the atom 111A on a surface of the oxide core 111, and mixing the oxide-containing complex 110 with the curable material 120 to provide the curable composition 100 including the oxide-containing complex 110 and the curable material 120.

The oxide-containing complex 110 and the curable material 120 may respectively be understood by referring to the descriptions of the oxide-containing complex 110 and the curable material 120 provided herein.

In an exemplary embodiment, providing of the oxide-containing complex 110 may include reacting an oxide precursor 110A with a compound represented by Formula 2:

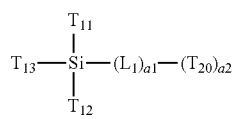

wherein in Formula 2, $L_1$, a1, $T_{20}$, and a2 may respectively be understood by referring to the descriptions of $L_1$, a1, $T_{20}$, and a2, and $T_{11}$ to $T_{13}$ may each independently be a hydroxyl group or a $C_1$-$C_{20}$ alkoxy group.

The oxide precursor 110A shown in FIG. 3 may be understood by referring to the description of the oxide core 111 described herein, except that the organic group 113 is not bound to an atom on a surface of the oxide precursor 110A, unlike the oxide core 111 described herein. At least one hydroxyl group may be present on a surface of the oxide precursor 110A, as shown in FIG. 3.

$T_{11}$ to $T_{13}$ in Formula 2 may be hydrolyzed to thereby be a silanol (*—Si—OH) group. As a result of a dehydration condensation reaction between the silanol group and a hydroxyl group on a surface of the oxide precursor 110A, the organic group 113 (e.g., the group represented by Formula 1) may be chemically bound to the atom 111A on a surface of the oxide core 111, as described herein.

For example, the compound represented by Formula 2 may be:

i) 3-(trimethoxysilyl)propyl methacrylate; or ii) a compound in which 3-(glycidyloxypropyl) trimethoxylan and poly(ethyleneglycol)methacrylate are bound to each other by an epoxy ring-opening reaction.

The reacting of the oxide precursor 110A with the compound represented by Formula 2 may be carried out in the presence of an acid catalyst. For example, the acid catalyst may include hydrochloric acid (HCl), sulfuric acid ($H_2SO_4$), acetic acid ($CH_3COOH$), nitric acid ($HNO_3$), or any combination thereof.

The solvent that may be used in reaction between the oxide precursor 110A and the compound represented by Formula 2 may be any suitable solvent that may be mixed with the oxide precursor 110A and the compound represented by Formula 2. For example, the solvent may include water, methanol, ethanol, ethylene glycol, glycerol, or any combination thereof. Cured material 200

According to another aspect, the curable composition 100 described above may be cured to prepare the cured material 200 of the curable composition 100. The cured material 200 of FIG. 5 may include the matrix material 220 derived from the curable material 120 included in the curable composition 100 of FIG. 4. The "matrix material 220 derived from the curable material 120" may be, for example, the matrix material 220 (e.g., a polymer) that is modified due to polymerization of the curable material 120 (e.g., a photopolymerizable monomer).

As shown in FIGS. 3 to 5, the atom 111A on a surface of the oxide-containing complex 110 included in the curable composition 100 may be "chemically bound" to the matrix material 220 via i) the residue group 118 derived from a reaction between the curable group 117 in the oxide-containing complex 110 and the curable material 120; and ii) the linking group 115 in the oxide-containing complex 110.

In some exemplary embodiments, the residue group 118 shown in FIG. 5 may be represented by Formula 3:

$$*\text{-}(L_{11})_{a11}\text{-}*'\qquad\text{Formula 3}$$

wherein, in Formula 3, $L_{11}$ may be:

*—N($R_{21}$)—*', *—O—*', *—S—*', or *—C(=O)—*'; or a $C_1$-$C_{60}$ alkylene group, a $C_1$-$C_{60}$ oxyalkylene group, a $C_6$-$C_{60}$ arylene group, or a $C_6$-$C_{60}$ oxyarylene group, each unsubstituted or substituted with deuterium, a hydroxyl group, a $C_1$-$C_{20}$ alkyl group, a $C_1$-$C_{20}$ alkoxy group, a phenyl group, a biphenyl group, or any combination thereof,

* and *' may each indicate a binding site to an adjacent atom, $R_{21}$ may be hydrogen, deuterium, a hydroxyl group, a $C_1$-$C_{20}$ alkyl group, a $C_1$-$C_{20}$ alkoxy group, a phenyl group, or a biphenyl group, a11 may be an integer from 1 to 10,000 (for example, an integer from 1 to 5,000 or an integer from 1 to 1,000), and when a11 is 2 or greater, at least two $L_{11}$(s) may be identical to or different from each other,

* in Formula 3 may indicate a binding site to the linking group 115 shown in FIG. 5, and

*' in Formula 3 may indicate a binding site to the matrix material 220 shown in FIG. 5.

The matrix material 220 in cured material 200 shown in FIG. 5 may be chemically bound to the oxide core 111 via i) the residue group 118 and ii) the linking group 115, thereby forming a network structure. As such, the oxide core 111 in the cured material 200 of FIG. 5 is chemically bound to the matrix material 220 via i) the residue group 118 and ii) the linking group 115, the cured material 200 may have excellent resilience upon application and/or removal of external force, as compared with a cured material in which a matrix material described above and an oxide core (e.g., a spherical oxide particle) are not "chemically bound to each other" and are "physically mixed" with each other (e.g., Film B).

The cured material 200 may be used in various applications, such as an adhesive member, an insulating member, an optical member, a protective member, a release member, and the like, all of which may be especially adapted for use in electronic devices and articles, depending on the matrix material 220. For example, the matrix material 220 in the cured material 200 may be an adhesive material. When the matrix material 220 in the cured material 200 is an adhesive material, the cured material 200 may be an adhesive member. The cured material 200 may be in the form of a film. For example, a thickness of the film may be in a range of about 0.1 μm to about 700 μm, about 1 μm to about 600 μm, or about 5 μm to about 500 μm (see, e.g., Films 1 to 3 in the Examples described herein).

The cured material 200 may have an excellent light transmittance. For example, a light transmittance of the cured material 200 with respect to light having the maximum emission wavelength of 600 nm is 96 percent (%) or higher, for example, about 97% to about 100%. Thus, the cured material 200 may be useful in various devices (e.g., an organic light-emitting device, a quantum dot light-emitting device, or the like) having a light-emitting member.

Method of Preparing Cured Material 200

A method of preparing the cured material 200 may include:

providing the curable composition 100 on a substrate; and curing the curable composition 100.

Upon the curing of the curable composition 100, a chemical reaction between the curable group 117 in the oxide-containing complex 110 and the curable material 120 may occur. As a result, the residue group 118 as shown in FIG. 5 may be formed. Therefore, the atom 111A on a surface of the oxide core 111 may be chemically bound to the matrix material 220 via i) the residue group 118 and ii) the linking group 115 in the oxide-containing complex 110.

A substrate onto which the curable composition 100 may be provided may be used in various manners depending on the application field. For example, when the cured material 200 is used as an adhesive member that adheres an electronic device member to a cover window, the substrate may be a top of the electronic device member.

The curing of the curable composition 100 may be performed by photopolymerization, and exposure may be carried out for photopolymerization. The exposure may be exposure to ultraviolet rays. The curing of the curable composition 100 may further include baking before and/or after the exposure for removing a portion of a solvent in the curable composition 100.

Article or Device Including Cured Material 200

According to some exemplary embodiments, an article or a device may include the cured material 200. The article may be a film laminate including the cured material 200. For example, the film laminate may be an antistatic film laminate including a substrate, the cured material 200, and an antistatic film, which are sequentially stacked in any of the devices disclosed herein.

The device may be various electronic devices, for example, an electronic device, a cellular phone, a lighting, and the like. For example, the electronic device may be a light-emitting diode (LED) such as an organic light-emitting device (OLED), a quantum dot light-emitting device (QLED) for use in an electronic device.

In an exemplary embodiment, the device may be a flexible device, a foldable device, or a rollable device, in which application and removal of external force is relatively frequent. Hereinafter, the curable composition 100, the cured material 200, and a method of preparing the same will be described in more detail through Examples and/or Comparative Examples.

EXAMPLES

Synthesis of Oxide-Containing Complex 1

An amount of 50 milliliters (mL) of ethanol and 2.5 g of $SiO_2$ particles (having a diameter D15 of 20 nm) were mixed together, followed by stirring for 30 minutes. The mixture was homogenized using a homogenizer in an ice water bath for 30 minutes. Then, a mixture of 2.5 g of 3-(trimethoxysilyl)propyl methacrylate (MEMO) and 1 mL of water were added dropwise thereto, followed by stirring for 2 hours. The pH of the resulting mixture was adjusted to 2 using hydrochloric acid aqueous solution (having a concentration of 38 mole %). Then, a reaction was carried out at a stirring rate of 800 rotations per minute (rpm) and at a temperature of 60° C. under reflux. The resulting mixture was washed with ethanol and water, and then, centrifuge (at 4,000 rpm) was performed for 30 minutes, followed by drying at a temperature of 60° C. for 4 hours, thereby preparing Oxide-containing Complex 1.

Synthesis of Oxide-Containing Complex 2

Oxide-containing Complex 2 was synthesized in substantially the same manner as in Synthesis of Oxide-containing Complex 1, except that MEMO was used in an amount of 3.375 g.

Synthesis of Oxide-Containing Complex 3

Oxide-containing Complex 3 was synthesized in substantially the same manner as in Synthesis of Oxide-containing Complex 1, except that MEMO was used in an amount of 6.75 g.

Synthesis of Oxide-Containing Complex A

Oxide-containing Complex A was synthesized in substantially the same manner as in Synthesis of Oxide-containing Complex 2, except that 2.5 g of $TiO_2$ particles (having a diameter D15 of 20 nm) was used instead of $SiO_2$ particles.

Preparation of Curable Composition 1

Oxide-containing Complex 1 (1 parts by weight), Curable Monomer 1 (60 parts by weight), Curable Monomer 2 (20 parts by weight), Curable Monomer 3 (4 parts by weight), Curable Monomer 4 (4 parts by weight), Curable Monomer 5 (10 parts by weight), and a photopolymerization initiator (1 parts by weight) were mixed together, followed by stirring for 30 minutes by using a paste mixer, to prepare Curable Composition 1. Curable Monomers 1 to 5 and the photopolymerization initiator may respectively be understood by referring to the descriptions of Curable Monomers 1 to 5 and the photopolymerization initiator provided herein.

Curable Monomer 1: 2-ethylhexyl acrylate (Aldrich Company)

Curable Monomer 2: isobornyl acrylate (Aldrich Company)

Curable Monomer 3: acrylic acid (Aldrich Company)

Curable Monomer 4: methyl methacrylate (Aldrich Company)

Curable Monomer 5: 2-hydroxyethyl acrylate (Aldrich Company)

Photopolymerization initiator: hydroxydimethyl acetophenone (Aldrich Company)

Preparation of Curable Compositions 2, 3, and A

Curable compositions 2, 3, and A were prepared in substantially the same manner as in Preparation of Curable Composition 1, except that Oxide-containing Complexes 2, 3, and A were respectively used instead of Oxide-containing Complex 1.

Preparation of Curable Composition B

Curable composition B was prepared in substantially the same manner as in preparation of Curable Composition 1, except that 2.5 g of $SiO_2$ particles (having a diameter D15 of 20 nm) was used instead of Oxide-containing Complex 1.

Preparation of Curable Composition C

Curable composition C was prepared in substantially the same manner as in Preparation of Curable Composition 1, except that Oxide-containing Complex 1 was not used.

TABLE 2

| Curable Composition No. | Used Oxide-Containing Complex or Oxide Particles | Oxide Core | Compound Used for Introducing a Curable Group to the Oxide Core |
|---|---|---|---|
| 1 | Oxide-Containing Complex 1 | $SiO_2$ Particles (2.5 g) | MEMO (2.5 g) |
| 2 | Oxide-Containing Complex 2 | $SiO_2$ Particles (2.5 g) | MEMO (3.375 g) |

TABLE 2-continued

| Curable Composition No. | Used Oxide-Containing Complex or Oxide Particles | Oxide Core | Compound Used for Introducing a Curable Group to the Oxide Core |
|---|---|---|---|
| 3 | Oxide-Containing Complex 3 | SiO$_2$ Particles (2.5 g) | MEMO (6.7 g) |
| A | Oxide-Containing Complex A | TiO$_2$ Particles (2.5 g) | MEMO (3.375 g) |
| B | Oxide Particles | SiO$_2$ Particles (2.5 g) | — |
| C | — | — | — |

Preparation of Film 1

Curable Composition 1 was provided to a space between two polyethylene terephthalate (PET) films using a roll-to-roll coater. Then, pre-baking was performed using a hotplate at a temperature of 100° C. for 1 minute, and UV light (365 nm) was incident at an exposure amount of 200 millijoules per square centimeter (mJ/cm$^2$) using an exposure device. Thereafter, in a nitrogen atmosphere, post-baking was performed in a heating oven at a temperature of 180° C. for 30 minutes, thereby preparing Film 1 having a thickness of 50 μm.

Preparation of Films 2, 3, A, B, and C

Films 2, 3, A, B, and C were prepared in substantially the same manner as in Preparation of Film 1, except that Curable Compositions 2, 3, A, B, and C were used instead of Curable Composition 1.

Evaluation Example 1 (Measurement of Light Transmittance)

Light transmittance (%) of Films 1, 2, 3, A, B, and C with respect to light having a maximum emission wavelength of 600 nm was measured using a UV-vis spectrometer. The results thereof are shown in Table 3. The light transmittance of each film is shown in a value (%) relative to the light transmittance of Film C.

TABLE 3

| Film No. | Used Oxide-Containing Complex or Oxide Particles | Oxide Core | Compound Used for Introducing a Curable Group to the Oxide Core | Light Transmittance to Light Having a Maximum Emission Wavelength of 600 nm (Relative Value, %) |
|---|---|---|---|---|
| 1 | Oxide-Containing Complex 1 | SiO$_2$ Particles (2.5 g) | MEMO (2.5 g) | 97.0 |
| 2 | Oxide-Containing Complex 2 | SiO$_2$ Particles (2.5 g) | MEMO (3.375 g) | 99.1 |
| 3 | Oxide-Containing Complex 3 | SiO$_2$ Particles (2.5 g) | MEMO (6.7 g) | 99.5 |
| A | Oxide-Containing Complex A | TiO$_2$ Particles (2.5 g) | MEMO (3.375 g) | 89.5 |
| B | Oxide Particles | SiO$_2$ Particles (2.5 g) | — | 95.4 |
| C | — | — | — | 100 |

Referring to the results of Table 3, it was found that Films 1 to 3 had an unexpected and surprisingly excellent light transmittance, as compared with Films A and B.

Evaluation Example 2 (Measurement of Peel Strength)

Samples were prepared according to the ASTM D3359-17 standard for a 180° peeling test method on Films 1, 2, 3, A, B, and C. Then, the peel strength (N/25 mm) was measured at a velocity of 300 mm/min. The results thereof are shown in Table 4. The peel strength of each film is shown in a value (%) relative to the peel strength of Film C.

TABLE 4

| Film No. | Used Oxide-Containing Complex or Oxide Particles | Oxide Core | Compound Used for Introducing a Curable Group to the Oxide Core | Peel Strength (Relative Value, %) |
|---|---|---|---|---|
| 1 | Oxide-containing Complex 1 | SiO$_2$ Particles (2.5 g) | MEMO (2.5 g) | 100 |
| 2 | Oxide-containing Complex 2 | SiO$_2$ Particles (2.5 g) | MEMO (3.375 g) | 96.6 |
| 3 | Oxide-containing Complex 3 | SiO$_2$ Particles (2.5 g) | MEMO (6.7 g) | 99.9 |
| A | Oxide-containing Complex A | TiO$_2$ Particles (2.5 g) | MEMO (3.375 g) | 92.0 |
| B | Oxide particles | SiO$_2$ Particles (2.5 g) | — | 94.9 |
| C | — | — | — | 100 |

Referring to the results of Table 4, it was found that Films 1 to 3 had an unexpected and surprisingly excellent peel strength, as compared with Films A and B.

Evaluation Example 3 (Measurement of Modulus in Break Point)

Samples were prepared according to the ASTM D882-18 standard for a tensile test method on Films 1, 2, 3, A, B, and C. Then, the modulus in break point in kiloPascals (kPa) was measured using a stress-strain diagram at a velocity of 50 mm/min. The results thereof are shown in Table 5. The modulus in break point of each film is shown in a value (%) relative to the modulus in break point of Film C.

TABLE 5

| Film No. | Used Oxide-Containing Complex or Oxide Particles | Oxide Core | Compound Used for Introducing a Curable Group to the Oxide Core | Modulus in Break Point (Relative Value, %) |
| --- | --- | --- | --- | --- |
| 1 | Oxide-Containing Complex 1 | $SiO_2$ Particles (2.5 g) | MEMO (2.5 g) | 115.6 |
| 2 | Oxide-Containing Complex 2 | $SiO_2$ Particles (2.5 g) | MEMO (3.375 g) | 133.3 |
| 3 | Oxide-Containing Complex 3 | $SiO_2$ Particles (2.5 g) | MEMO (6.7 g) | 141.7 |
| A | Oxide-Containing Complex A | $TiO_2$ Particles (2.5 g) | MEMO (3.375 g) | 83.2 |
| B | Oxide Particles | $SiO_2$ Particles (2.5 g) | — | 136.0 |
| C | — | — | — | 100.0 |

Referring to the results of Table 5, Films 1 to 3 were found to have a modulus in break point better than Film A and equal to or better than Film B.

Evaluation Example 4 (Measurement of Relaxation Ratio)

Samples were prepared according to the ASTM D882-18 standard for a stress-relaxation test method on Films 1, 2, 3, A, B, and C. Next, the relaxation ratio (%) was measured under a given condition of a velocity of 100 mm/min and 200% strain. The results thereof are shown in Table 6. The relaxation ratio of each film is shown in a value (%) relative to the relaxation ratio of Film C.

| Film No. | Used Oxide-Containing Complex or Oxide Particles | Oxide Core | Compound Used for Introducing a Curable Group to the Oxide Core | Relaxation Ratio (Relative Value, %) |
| --- | --- | --- | --- | --- |
| 1 | Oxide-containing Complex 1 | $SiO_2$ Particles (2.5 g) | MEMO (2.5 g) | 59.48 |
| 2 | Oxide-containing Complex 2 | $SiO_2$ Particles (2.5 g) | MEMO (3.375 g) | 55.64 |
| 3 | Oxide-Containing Complex 3 | $SiO_2$ Particles (2.5 g) | MEMO (6.7 g) | 44.36 |
| A | Oxide-Containing Complex A | $TiO_2$ Particles (2.5 g) | MEMO (3.375 g) | 97.51 |
| B | Oxide Particles | $SiO_2$ Particles (2.5 g) | — | 124.93 |
| C | — | — | — | 100 |

Referring to the results of Table 6, it was found that Films 1 to 3 had an unexpected and surprisingly excellent relaxation ratio, i.e., excellent elasticity, as compared with Films A, B, and C.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A curable composition comprising:
   a curable material; and
   an oxide-containing complex;
   wherein the oxide-containing complex comprises i) an oxide core and ii) an organic group chemically bound to an atom on a surface of the oxide core,
   the organic group comprises a) a curable group reactable with the curable material and b) a linking group linking the atom on a surface of the oxide core to the curable group,
   the oxide core comprises an aluminum oxide, a silicon oxide, or a combination thereof, and
   wherein the organic group is of Formula 1:

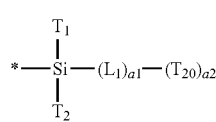

Formula 1 wherein, in Formula 1,
$L_1$ is:
*—N($R_{11}$)—*', *—O—*', *—S—*', or *—C(=O)—*';
or
a $C_1$-$C_{60}$ alkylene group, a $C_1$-$C_{60}$ oxyalkylene group, a $C_6$-$C_{60}$ arylene group, or a $C_6$-$C_{60}$ oxyarylene group, each optionally substituted with deuterium, a hydroxyl group, a $C_1$-$C_{20}$ alkyl group, a $C_1$-$C_{20}$ alkoxy group, a phenyl group, a biphenyl group, or any combination thereof;
* and *' each indicate a binding site to an adjacent atom;
$R_{11}$ is hydrogen, deuterium, a hydroxyl group, a $C_1$-$C_{20}$ alkyl group, a $C_1$-$C_{20}$ alkoxy group, a phenyl group, or a biphenyl group;
a1 is an integer from 1 to 10,000, and when a1 is 2 or greater, at least two $L_1$(s) are identical to or different from each other;
$T_{20}$ is a curable group;
a2 is an integer from 1 to 10, and when a2 is 2 or greater, at least two $T_{20}$(s) are identical to or different from each other; and
$T_1$ and $T_2$ are each, independently from one another, hydrogen, deuterium, a hydroxyl group, a $C_1$-$C_{20}$ alkyl group, a $C_1$-$C_{20}$ alkoxy group, a phenyl group, a biphenyl group, an oxygen atom bound to a silicon atom in an adjacent linking group, or a binding site to oxygen disposed between the linking group and an adjacent linking group;
wherein in Formula 1, * indicates a binding site to the atom on a surface of the oxide core.

2. The curable composition of claim 1, wherein the oxide core has a diameter D15 of about 1 nm to about 50 nm.

3. The curable composition of claim 1, wherein the oxide core has a refractive index of about 1.2 to about 2.5.

4. The curable composition of claim 1, wherein the $T_{20}$ curable group is a group of Formulae 1-2(1) to 1-2(8):

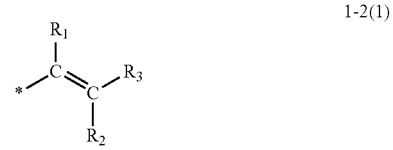

1-2(1)

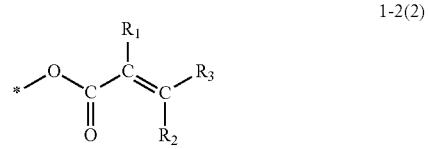

1-2(2)

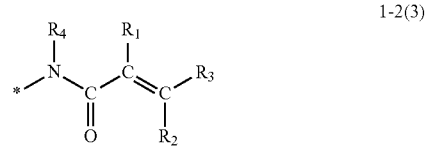

1-2(3)

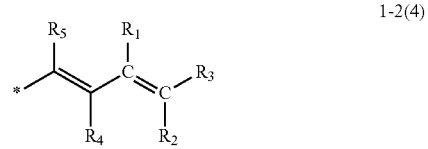

1-2(4)

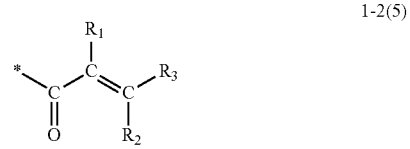

1-2(5)

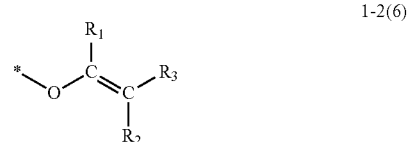

1-2(6)

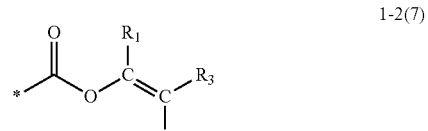

1-2(7)

 

1-2(8)

wherein, in Formulae 1-2(1) to 1-2(8),
$R_1$ to $R_5$ are each, independently from one another, hydrogen, deuterium, a hydroxyl group, a $C_1$-$C_{20}$ alkyl group, a $C_1$-$C_{20}$ alkoxy group, a phenyl group, or a biphenyl group; and
* indicates a binding site to the linking group.

5. The curable composition of claim 1, wherein the oxide core and the organic group in the oxide-containing complex have a weight ratio between about 10:1 to about 1:10.

6. The curable composition of claim 1, wherein the curable material has a refractive index of about 1.2 to about 2.0.

7. The curable composition of claim 1, wherein a difference between a refractive index of the curable material and a refractive index of the oxide core is about 0.01 to about 0.5.

8. A method of preparing a curable composition, the method comprising the steps of:
providing an oxide-containing complex including i) an oxide core and ii) an organic group chemically bound to an atom on a surface of the oxide core; and
mixing the oxide-containing complex with a curable material to provide a curable composition including the oxide-containing complex and the curable material;
wherein the organic group comprises a) a curable group reactable with the curable material and b) a linking group linking the atom on a surface of the oxide core to the curable group;
the oxide core comprises an aluminum oxide, a silicon oxide, or a combination thereof; and:
wherein the organic group is of Formula 2:

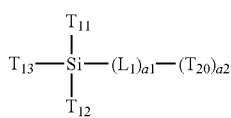

Formula 2 wherein, in Formula 2,
$L_1$ is:
*—N($R_{11}$)—*', *—O—*', *—S—*', or *—C(=O)—*'; or
a $C_1$-$C_{60}$ alkylene group, a $C_1$-$C_{60}$ oxyalkylene group, a $C_6$-$C_{60}$ arylene group, or a $C_6$-$C_{60}$ oxyarylene group, each optionally substituted with deuterium, a hydroxyl group, a $C_1$-$C_{20}$ alkyl group, a $C_1$-$C_{20}$ alkoxy group, a phenyl group, a biphenyl group, or any combination thereof;
* and *' each indicate a binding site to an adjacent atom;
$R_{11}$ is hydrogen, deuterium, a hydroxyl group, a $C_1$-$C_{20}$ alkyl group, a $C_1$-$C_{20}$ alkoxy group, a phenyl group, or a biphenyl group;
a1 is an integer from 1 to 10,000, and when a1 is 2 or greater, at least two $L_1$(s) are identical to or different from each other;

$T_{20}$ is a curable group;
a2 is an integer from 1 to 10, and when a2 is 2 or greater, at least two $T_{20}$(s) are identical to or different from each other; and
$T_{11}$ to $T_{13}$ are each, independently from one another, a hydroxyl group or a $C_1$-$C_{20}$ alkoxy group.

9. A cured material comprising the curable composition of claim 1.

10. The cured material of claim 9, wherein the cured material comprises a matrix material derived from the curable material, and the atom on a surface of the oxide core in the oxide-containing complex is chemically bound to the matrix material via i) a residue group derived from a reaction between the curable group in the oxide-containing complex and the curable material, and ii) the linking group in the oxide-containing complex.

11. The cured material of claim 10, wherein the matrix material comprises an adhesive material.

12. The cured material of claim 10, wherein the cured material is in the form of a film.

13. The cured material of claim 12, wherein the film has a thickness of about 0.1 μm to about 700 μm.

14. The cured material of claim 10, wherein a light transmittance with respect to light having a maximum emission wavelength of 600 nm is about 96% or higher.

15. A method of preparing a cured material comprising the steps of:
providing the curable composition of claim 1 on a substrate; and
curing the curable composition.

16. The method of claim 15, wherein the step of curing of the curable composition comprises exposing the curable composition to ultraviolet rays.

17. An electronic device comprising the cured material of claim 10.

18. The electronic device of claim 17, wherein the electronic device comprises a flexible, foldable, or rollable electronic device.

* * * * *